Patented Jan. 8, 1952

2,581,940

UNITED STATES PATENT OFFICE 2,581,940

STANNOUS ALKYLCATECHOLATES

George E. P. Smith, Jr., Akron, Ohio, assignor to The Firestone Tire & Rubber Company, Akron, Ohio, a corporation of Ohio No Drawing. Application August 10, 1948, Serial No. 43,529

5 Claims. (Cl. 260—429)

This invention relates to stannous salts of alkylcatechols. These compounds may contain one or more alkyl groups. Each alkyl group may contain up to twelve or more carbon atoms. The compounds are valuable as rubber stabilizers. Many of the alkylcatechols are relatively insoluble in water and therefore the stannous alkylcatecholates usually cannot be prepared by the methods of preparing unsubstituted stannous catecholate in which purely aqueous reaction mixtures are employed. The stannous alkylcatecholates are usually made in solutions which are formed entirely or only partially of organic solvents, e. g. alcohol or alcohol and water.

The invention includes, for example, the stannous salts of p-methylcatechol, p-ethylcatechol, p-decylcatechol, p-isopropylcatechol, o-tert-butylcatechol, o-methylcatechol, o-ethylcatechol, methyl-tert-butylcatechol, methyl decylcatechol, heptylcatechol, di(tert-butyl) catechol, 4,5-dimethylcatechol, 4,6-dimethylcatechol, the diamylcatechols, the dihexylcatechols, the trimethylcatechols, tetramethylcatechol, etc.

The parent compound referred to herein as catechol is o-dihydroxybenzene. It is sometimes called pyrocatechin. The stannous compounds are referred to herein as salts because it is believed that they are true neutral salts. They may be hydrated. One reason for believing that they are salts and not loose complexes or chelates is that they may be formed by different methods as illustrated in Examples 1 and 2. They contain one molecular weight of tin for each molecular weight of the alkylcatechol and are therefore referred to as normal salts.

The examples illustrate the preparation of certain of the compounds of this invention.

EXAMPLE 1

*Stannous p-tert-butylcatecholate*

One hundred grams (0.6 mole) of p-tert-butylcatechol was dissolved in 300 ml. ethanol. One hundred fifty grams (0.67 mole) of stannous chloride dihydrate was added with shaking. It dissolved almost completely. The reaction mixture was chilled in an ice bath and stirred mechanically while there was dropped into it 55 grams of sodium hydroxide (1.38 mole) dissolved in 225 ml. of water. Fifty milliliters of water and 50 ml. of ethanol were added as the mixture became thick. Then 75 ml. additional water was added for thinning. The reaction mixture was filtered, washed with water and ethanol, and then dried in air at about 35° C. Yield 180 grams.

Analysis:
Calc. for $C_4H_9.C_6H_3O_2Sn$—Sn=42.0%
Calc. for $C_4H_9.C_6H_3O_2Sn.H_2O$—Sn=39.5%
Found—Sn=38.4%

EXAMPLE 2

*Stannous p-tert-butylcatecholate*

Stannous p-tert-butylcatecholate was prepared by dissolving 10 grams of p-tert-butylcatechol in an aqueous solution containing 5.1 grams of sodium hydroxide. A blood red solution was obtained, to which was added slowly and with stirring 13.6 grams of stannous chloride dihydrate in 100 cc. of water. The red color disappeared as a pure white precipitate was formed. The precipitate was separated and dried and was found to be identical with that prepared in Example 1.

EXAMPLE 3

*Stannous 4-tert-butyl-3-methylcatecholate*

Nine and five-tenths grams of 4-tert-butyl-3-methylcatechol and 11.9 grams of stannous chloride dihydrate were dissolved in 200 ml. of methanol. To the resulting solution a solution of 4.2 grams of sodium hydroxide in 200 ml. of 25 per cent methanol were added slowly while stirring. The resulting precipitate was filtered, washed with alcohol-water and then with water. Yield 12.6 grams.

EXAMPLE 4

*Stannous dibutylcatecholate*

Twenty-two and two-tenths grams of dibutylcatechol (.1 mole) and 22.6 grams of stannous chloride dihydrate were dissolved in 500 ml. of ethyl alcohol. A solution of 8.0 grams of sodium hydroxide in 150 ml. of 40 per cent alcohol was added slowly during stirring. The resulting precipitate was filtered. It was washed with alcohol and then with alcohol-water. The yield was 23.0 grams of dried stannous dibutylcatecholate.

EXAMPLE 5

*Stannous octylcatecholate*

Nine and five-tenths grams of octylcatechol was dissolved in 150 ml. of methanol. Nine and six-tenths grams of stannous chloride dihydrate was then dissolved in the resulting solution. To this was added a solution of 3.4 grams of sodium hydroxide in 125 ml. of 30 per cent methanol. The precipitate was filtered with suction, washed with methanol-water and then with water, and then dried. Yield 13.3 grams.

EXAMPLE 6

*Stannous octyl-4-methylcatecholate*

Seven and five-tenths grams of octyl-4-methylcatechol was dissolved in 150 ml. of methanol and then 7.2 grams of stannous chloride dihydrate was added and dissolved. A solution of 2.54 grams of sodium hydroxide in 100 ml. of 25 per cent methanol was added slowly during stirring. The precipitate was filtered, washed once with methanol-water and twice with water. The dried product weighed 9.6 grams.

EXAMPLE 7

*Stannous heptylcatecholate*

Six and five-tenths grams of heptylcatechol and 71.1 grams of stannous chloride dihydrate were dissolved in 150 ml. of methanol. To this a solution of 2.5 grams of sodium hydroxide in 100 ml. of 25 per cent methanol was added. The product was filtered with suction, washed with water-alcohol, and then with water. When dry it weighed 9.0 grams.

EXAMPLE 8

*Stannous 4,5-dimethylcatecholate*

Six and five-tenths grams of 4,5-dimethylcatechol was dissolved in 100 ml. of 30 per cent methanol and 10.6 grams of stannous chloride dihydrate was added. To the resulting solution a solution of 3.76 grams of sodium hydroxide in 100 ml. of water was added slowly during stirring. The precipitate was filtered and washed with methanol-water. After drying it weighed 11.7 grams.

The above examples are illustrative.

What I claim is:

1. Stannous alkylcatecholates.
2. Stannous 4-tertiary butylcatecholate.
3. Stannous octyl-4-methylcatecholate.
4. Stannous di-butylcatecholate.
5. A stannous alkylcatecholate which contains one to twelve alkyl carbon atoms per molecule.

GEORGE E. P. SMITH, JR.

REFERENCES CITED

The following references are of record in the file of this patent:

UNITED STATES PATENTS

| Number | Name | Date |
| --- | --- | --- |
| 2,252,663 | Reiff | Aug. 12, 1941 |
| 2,310,449 | Lightbown et al. | Feb. 9, 1943 |
| 2,445,727 | Kinzinger | Aug. 25, 1944 |

OTHER REFERENCES

Majima et al., "Ber. deutsch. chem. Ges.," vol. 46 (1913), page 4083.

Beilstein, "Handbuch der Org. Chemie," 4th ed., vol. 6, 1st. Supp. (1931), page 456.

Spath et al., "Ber. deutsch. chem. Ges.," vol. 60 (1927), page 1888.

Beilstein, "Handbuch der Org. Chemie," 4th ed., vol. 6, 2nd Supp. (1944), page 892.